Figure 1:
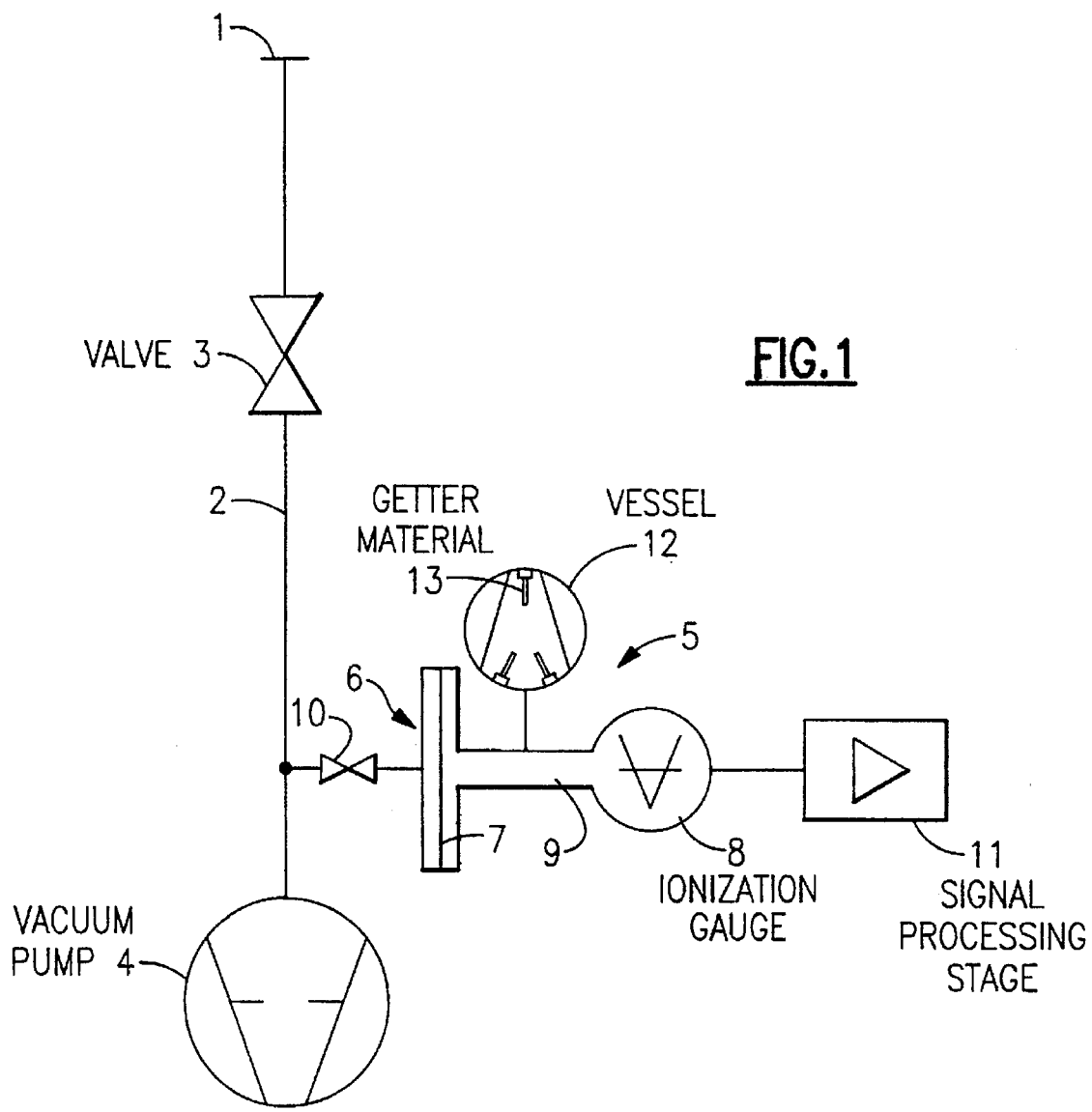

United States Patent [19]

Bohm et al.

[11] Patent Number: 5,661,229
[45] Date of Patent: Aug. 26, 1997

[54] TEST GAS DETECTOR, PREFERABLY FOR LEAK DETECTORS, AND PROCESS FOR OPERATING A TEST GAS DETECTOR OF THIS KIND

[75] Inventors: Thomas Bohm, Cologne; Ulrich Dobler, Wermelskirchen, both of Germany

[73] Assignee: Leybold Aktiengesellschaft, Cologne, Germany

[21] Appl. No.: 586,794

[22] PCT Filed: Jul. 14, 1994

[86] PCT No.: PCT/EP94/02311

§ 371 Date: Feb. 1, 1996

§ 102(e) Date: Feb. 1, 1996

[87] PCT Pub. No.: WO95/04921

PCT Pub. Date: Feb. 16, 1995

[30] Foreign Application Priority Data

Aug. 5, 1993 [DE] Germany .................. 43 26 265.1

[51] Int. Cl.⁶ .................................. G01M 3/04
[52] U.S. Cl. ........................... 73/40.7; 315/111.91
[58] Field of Search ................. 315/111.91; 73/40.7

[56] References Cited

U.S. PATENT DOCUMENTS 3,591,827  7/1971  Hall .
5,193,380  3/1993  Tallon ........................... 73/40.7
5,325,708  7/1994  De Simon ....................... 73/40.7
5,386,717  2/1995  Toda ............................ 73/40.7
5,390,533  2/1995  Schulte et al. ................. 73/40.7

FOREIGN PATENT DOCUMENTS 0352371  1/1990  European Pat. Off. .
1181312  6/1959  France .
8804774  6/1988  WIPO .

OTHER PUBLICATIONS

Technisches Messen, Vo. 49, No. 5, May 1982, Muenchen, DE pp. 193–199, R. Larson, *Present State of the Art of Helium Mass Spectrometer Leak.*

*Primary Examiner*—Hezron E. Williams
*Assistant Examiner*—Jay L. Politzer
*Attorney, Agent, or Firm*—Harris Beach & Wilcox, LLP

[57] ABSTRACT

The invention relates to a test gas detector, preferably for leak detection instruments, with a selective, preferably test-gas-permeable inlet system (6) and with a device (5) recording the presence of test gas; to reduce the complexity in the production of the vacuum it is proposed that the test gas recorder (5) comprise a gas consuming vacuum gauge (8).

8 Claims, 2 Drawing Sheets

TEST GAS DETECTOR, PREFERABLY FOR LEAK DETECTORS, AND PROCESS FOR OPERATING A TEST GAS DETECTOR OF THIS KIND

The invention relates to a test gas detector, preferably for leak detection instruments, with a selective, preferably test-gas-permeable inlet system, and with a device recording the presence of test gas. Moreover, the invention relates to a method for operating of a test gas detector of this kind.

In the case of high-sensitivity leak detection, chiefly only helium is considered as the test gas. Therefore, in the following text, mainly helium is referred too as the test gas.

In helium leak detection instruments, mass spectrometers are commonly employed as detectors which are set to the mass of helium. Operation of a mass spectrometer requires a high vacuum pump system (high vacuum pump, backing pump etc.) through which the helium entering in the case of a positive test, is removed (refer to DE-A-34 21 533, for example).

From EU-A-352 371 a helium leak detector of the kind affected here, is known. A getter ion pump is employed as the vacuum pump. Even relatively small getter ion pumps are heavy in weight and thus unhandy.

It is the task of the present to significantly reduce the complexity in the generation of the vacuum for test gas detectors, particularly helium detectors for leak detection instruments.

According to the present invention this task is solved for a test gas detector of the aforementioned kind, in that the test gas recording apparatus comprises a gas consuming vacuum gauge. Ionization vacuum gauges, preferably cold cathode ionization gauges, possess a gas consuming property. Vacuum gauges of this kind exhibit only a relatively low pumping speed for helium. Therefore, if helium enters into the vacuum gauge through the inlet of the test gas detector, this will make itself felt by way of a pressure increase. The rate at which the pressure increases is a measure of the magnitude of the helium partial pressure, and is thus—when employing a detector of this kind for the purpose of leak detection—a measure of the leak rate.

A special advantage of the present invention is, that involved evacuation systems for the test gas detector are no longer necessary. Since the ionization vacuum gauge itself has a gas consuming effect, it is in a position to maintain the operating vacuum in the measurement space. Additionally, the measurement space may contain a getter material, which supports the pumping effect of the vacuum gauge.

Preferably the getter material has the property to pump all gases—except the test gas. A getter material of this kind is SAES Getters Type ST707, for example. The sensitivity of the measurements is not impaired by a getter material of this kind.

A further advantage offered by the present invention is that an inadmissibly high pressure increase in the measurement space which limits the service life of the test gas detector is not to be expected. On the one hand, the ionization vacuum gauge pumps, to a slight extent, also the helium entering the measurement space; on the other hand there is the possibility of being able to remove helium entering the measurement space via the gas inlet again. For this—during the standby mode, for example—a vacuum having a low helium partial pressure is generated and maintained ahead of the open selective inlet system. Thus helium in the measurement space diffuses back through the selective inlet into the pumping line.

The current signal supplied by the vacuum gauge is preferably applied to a high-sensitivity current-to-voltage converter. This is, within the scope of the present invention, preferably designed as a differentiating stage, the amplification of which increases with rising frequency. In the case of such a differentiating stage, a pressure increase will result in a constant output signal which is proportional to the leak rate.

Separating walls made of solid bodies, the permeability of which for helium exceed by many decades the permeability for other gases, are employed as the selective inlet. These solid bodies may, for example, be quartz glass, silica which are supported by a sintered metal, if required. Through heating, the permeability for helium is increased by several decades. Also polymer diaphragms, FEP, for example, with selective properties may be employed. Polymers are a class of material which is described in great detail in the handbooks. Due to the permeation properties stated for each material of this class, the expert is in a position to select such a diaphragm material in each case which has the desired selective properties. The desired selective property in each case, for example the preferred passage of the test gas should be as prominent as possible, so that the desired effect—the suppression of other gases, contamination etc.—is achieved in the best possible manner.

A detection system with a heatable quartz glass window in the inlet area is preferably operated in such a manner that after a sufficient quantity of helium has been allowed to pass for the formation of the measurement signal, the heater is switched off. Thus it is possible to avoid the entry of too much helium into the detection system. Moreover, a very short recovery time is attained. Helium which continues to diffuse into the quartz glass window, diffuses back into the pumping line after the heater is switched on again.

Figure 2:
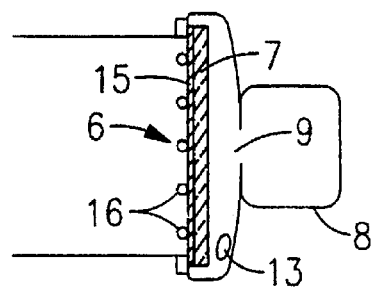
Figure 3:
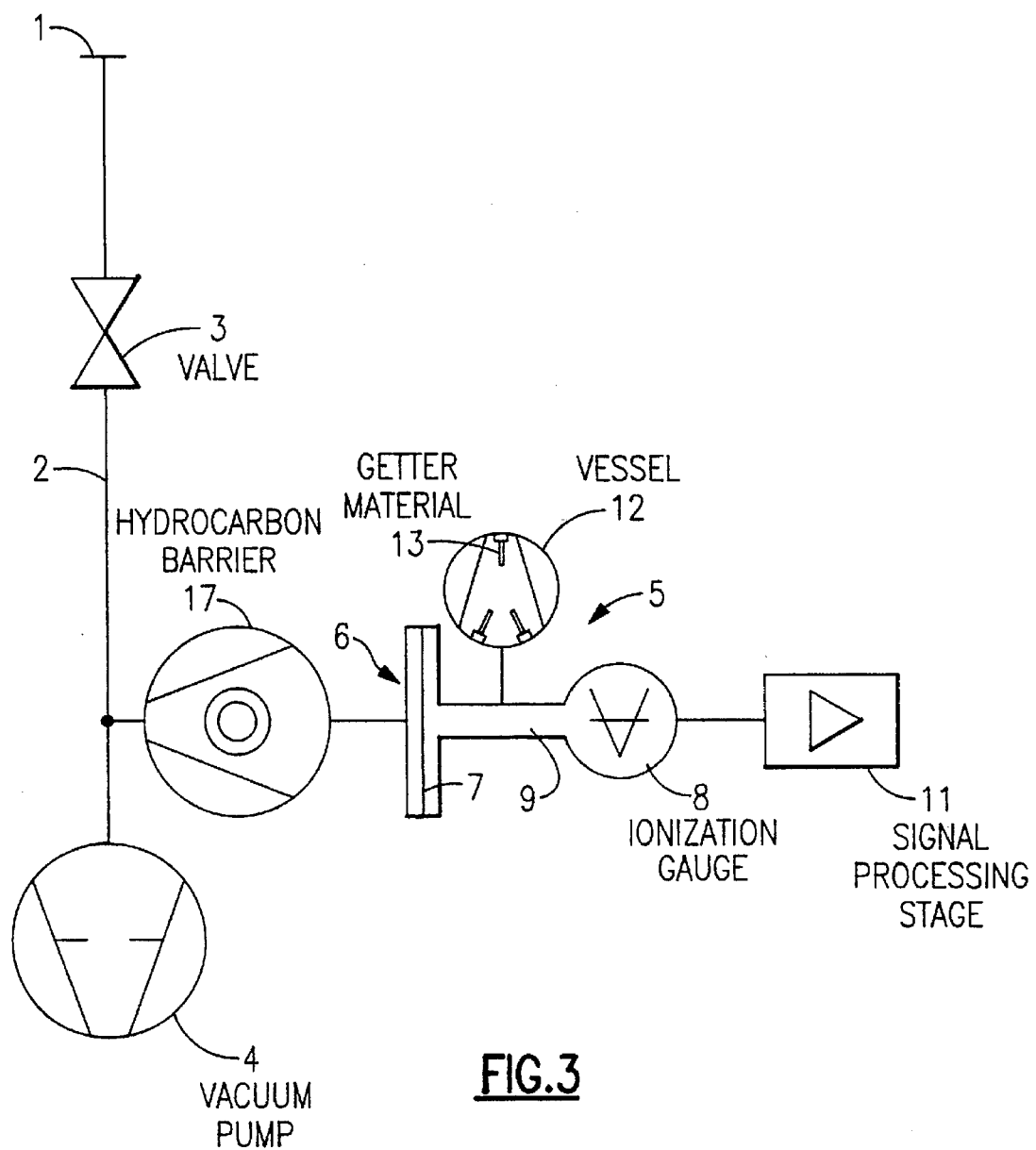

Further advantages and details of the present invention shall be explained by referring to the design examples presented in drawing FIGS. 1 to 3.

Drawing FIG. 1 shows a schematic representation of a leak detection instrument with a test gas detector according to the present invention.

Drawing FIG. 2 shows an example for a selective inlet system and an ionization vacuum gauge.

Drawing FIG. 3 shows a leak detector according to drawing FIG. 1 with a hydrocarbon barrier ahead of the test gas detector.

In the design examples according to drawing FIGS. 1 and 3, the inlet of the schematically represented leak detector is designated as 1. This inlet 1 is connected to a test specimen or a test chamber. The line 2 with valve 3 which connects to inlet 1, leads to a vacuum pump 4, through which the gas which is to be tested is pumped passed test gas detector 5. Also the possibly necessary evacuation of the test specimen or a test chamber can be performed with the aid of vacuum pump 4.

Part of the inlet system 6 of the test gas detector 5, is a diaphragm or window 7, which is substantially only permeable for the test gas. Polymer diaphragms, for example, or thin heated quartz glass windows have these abilities (refer to EU-A 352371).

If a polymer diaphragm is employed in the inlet system 6, then preferably a valve 10 is also provided, through which the test gas detector 5 can be separated from line 2. If the inlet system 6 comprises a quartz glass layer, then there exists the possibility of being able to provide or block the connection of the test gas detector 5 to line 2 by switching a heater on or off.

The space downstream with respect to the diaphragm or window 7 is directly linked to the inner space of the ionization gauge 8 and is termed measurement space 9. The ionization gauge 8 is followed by signal processing stage 11. It is only represented by a block with an amplifier symbol.

Connected to measurement space 9 is also a vessel 2 with a getter material 13 which supports the pumping effect of the gas consuming vacuum gauge 8.

Shown in drawing FIG. 2 is a design example for a selective inlet system 6. It comprises a window or layer 7 made of quartz glass, which is supported by a disc-like carrier 15 made of sintered metal. It is of a particular advantage to deposit the quartz glass on the porous sintered metal disc by evaporation coating. Thus, very even layers of quartz glass may be produced, which—together with their carrier—are rugged and thus easy to handle.

The sintered metal window and thus the quartz glass layer 7 is heatable by means of a heater (heating filaments 16). The ionization vacuum gauge 8 is placed directly ahead of the quartz glass layer 7, so that the measurement space 9 which comprises the inside space of the vacuum gauge is as small as possible. The getter material 13 is present in measurement space 9.

If the gas pumped past the gas detector 5 by means of vacuum pump 4 is not free of oil or similar vapors, then it is expedient to place a hydrocarbon barrier 17 ahead of the inlet system 6. This barrier may be designed as a cold trap or—as shown in drawing FIG. 3—it may be designed as a turbomolecular pumping stage. The relatively heavy hydrocarbon molecules will then be prevented from reaching the inlet system 6. Any contamination of the inlet system 6—caused by cracking of the oil molecules in the area of the heated quartz glass layer, for example—will not occur.

Before starting up the test gas detector 5 according to the present invention for the first time, the measurement space 9 is preferably evacuated with the aid of a separate vacuum pump. Thereafter, it is in a position to maintain its operating vacuum.

When helium flows through line 2 past the inlet system 6, then part of the helium will enter into measurement space 9 when valve 10 is open or when the quartz glass layer 7 is heated. The resulting pressure increase is recorded by the ionization gauge 8 and displayed by measurement data processing stage 11. An increase in the partial pressure of helium is processed by a differentiating amplifier so that a constant output signal is obtained which is proportional to the leak rate. In as much as vacuum gauge 8 itself is in a position to pump helium, the helium partial pressure is again reduced. In order to avoid too much helium from entering into measurement space 9, it is expedient to separate the test gas detector 5 from line 2 after having recorded the helium signal.

Moreover, there exists the possibility of generating a vacuum in line 2 when valve 3 is closed, and to provide the connection between test gas detector 5 and the line 2 by opening valve 10 or by heating the quarts glass layer. Since the helium partial pressure in line 2 is less than $10^{-9}$ mbar, the helium flows from the measurement space of the test gas detector 5 back through the inlet system 6, as long as the helium pressure there is higher. Thus, test gas detector 5 may be "regenerated" during standby operation.

We claim:

1. A test gas detector comprising:

an inlet;

a gas consuming vacuum gauge for recording the presence of a test gas passing through said inlet;

a porous sintered metal disc disposed in said inlet; and a quartz glass layer deposited on said disc.

2. The test gas detector of claim 1 wherein said quartz glass layer is deposited on said disc through evaporation coating providing a selective gas permeable member such that the test gas may pass through said inlet.

3. The test gas detector of claim 1 wherein said gas consuming vacuum gauge comprises a cold cathode ionization gauge.

4. The test gas detector of claim 3 wherein a getter material is present in the vacuum gauge.

5. The test gas detector of claim 1 wherein said getter material has the property to pump all gasses except the test gas.

6. The test gas detector of claim 5 wherein said disc is heatable.

7. The test gas detector of claim 6 wherein a hydrocarbon barrier is placed ahead of the inlet.

8. The test gas detector of claim 7 wherein said hydrocarbon barrier comprises a turbomolecular pump.

* * * * *